United States Patent [19]
Yang

[11] Patent Number: 5,083,991
[45] Date of Patent: Jan. 28, 1992

[54] AUTOMATIC SPEED-VARIATING SYSTEM

[76] Inventor: Chung-Chieh Yang, c/o Hung Hsing Patent Service Center P.O. Box 55-1670, Taipei (10477), Taiwan

[21] Appl. No.: 734,156

[22] Filed: Jul. 22, 1991

[51] Int. Cl.$^5$ .............................................. F16H 00/00
[52] U.S. Cl. ..................................... 475/259; 192/46; 475/293
[58] Field of Search ............... 475/259, 260, 261, 293; 74/342; 192/46

[56] References Cited
U.S. PATENT DOCUMENTS

| | | | |
|---|---|---|---|
| 813,465 | 2/1906 | Svenson | 475/293 |
| 3,494,227 | 2/1970 | Shimano et al. | 475/259 |
| 3,546,970 | 12/1970 | Schwerdhofer | 475/259 |
| 3,557,922 | 1/1971 | Schwerdhofer | 475/259 X |
| 4,229,997 | 10/1980 | Schwerdhofer | 475/259 |
| 4,838,401 | 6/1989 | Nagano | 192/46 X |
| 5,004,083 | 4/1991 | Lohman | 192/46 X |
| 5,011,464 | 4/1991 | White | 475/259 X |

Primary Examiner—Dwight Diehl

[57] ABSTRACT

An automatic speed-variating system includes: a first speed-variating device formed on a driving rotating device such as a bike pedal and its driving chain sprocket having a first planetary gear system and a ratchet wheel for preliminarily manually variating a speed of the driving rotating device, and a second speed-variating device formed on a follower rotating device such as a follower chain sprocket formed on a bike rear wheel driven by the driving rotating device having at least a second planetary gear system operatively engageable with the follower chain sprocket by at least a centrifugal coupling for automatically variating a speed of the follower rotating device.

10 Claims, 6 Drawing Sheets

AUTOMATIC SPEED-VARIATING SYSTEM

BACKGROUND OF THE INVENTION

A conventional derailleur gear system may be used on a bicycle for variating a running speed of the bike, which comprises a free wheel with more sprockets, a mechanism that alters the line of the chain and cause it to jump from one sprocket to another, and a tension pinion to take up or let out the slack in the chain for selecting various gear ratios for speed variation. However, such a conventional speed variation means has the following drawbacks:

1. Even so many sprockets are provided in the derailleur gear system, only two or three sprockets are used in a practical operation, thereby causing installation and maintenance inconvenience.

2. During the jumping of chain from one sprocket to another sprocket, the chain may be disengaged from the chain sprocket to influence a normal bike running.

3. A maximum speed or a minimum speed depends upon a diameter of the smallest sprocket or the largest sprocket. However, the diameter ratio of the largest sprocket to the smallest one is quite limited, thereby limiting a speed variating ratio of the bike.

4. The conventional derailleur gear system does not provide an automatic speed variation, thereby causing driving inconvenience.

Meanwhile, a conventional car of internal combustion engine has an automatic transmission which is operated by a hydraulic mechanism, being quite complex to thereby increase installation cost and maintenance problems.

The present inventor has found the drawbacks of a conventional speed variating means and invented the present automatic speed-variating means.

SUMMARY OF THE INVENTION

The object of the present invention is to provide a simple mechanical automatic speed-variating system including: a first speed-variating device formed on a driving rotating device such as a bike pedal and its driving chain sprocket having a first planetary gear system and a ratchet wheel for manually preliminarily variating a speed of the driving rotating device, and a second speed-variating device formed on a follower rotating device such as a follower chain sprocket formed on a bike rear wheel driven by the driving rotating device having at least a second planetary gear system operatively engageable with the follower chain sprocket by at least a centrifugal coupling for automatically variating a speed of the follower rotating device. A chain or a gear is provided to connect the first and the second speed-variating devices.

DETAILED DESCRIPTION

Figure 1:
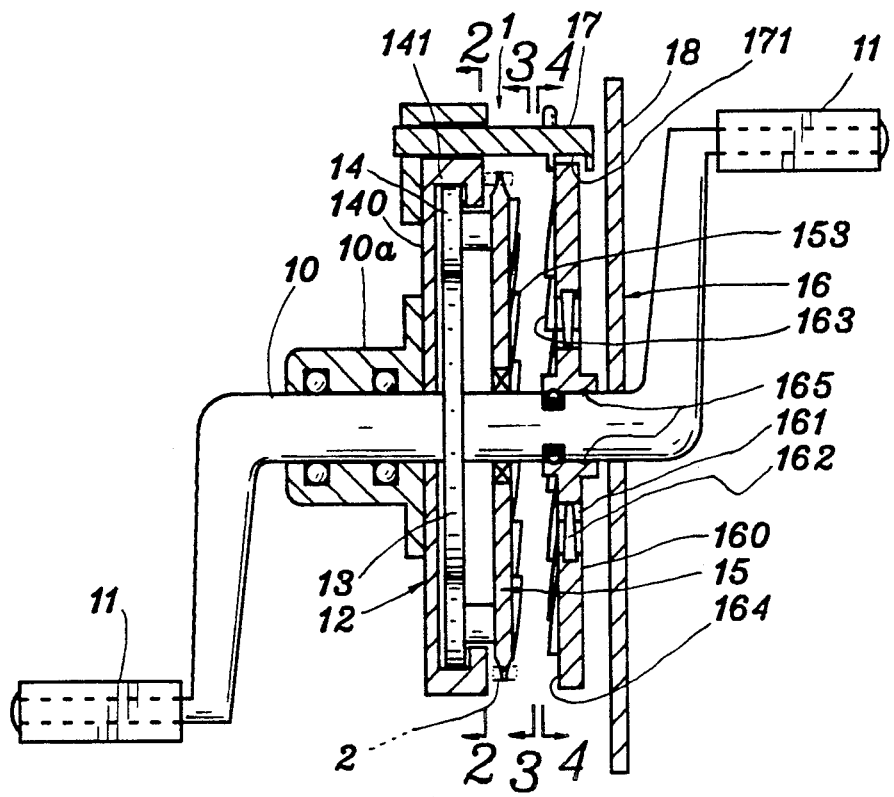
FIG. 1 is an illustration showing a first speed-variating means of the present invention.
Figure 6:
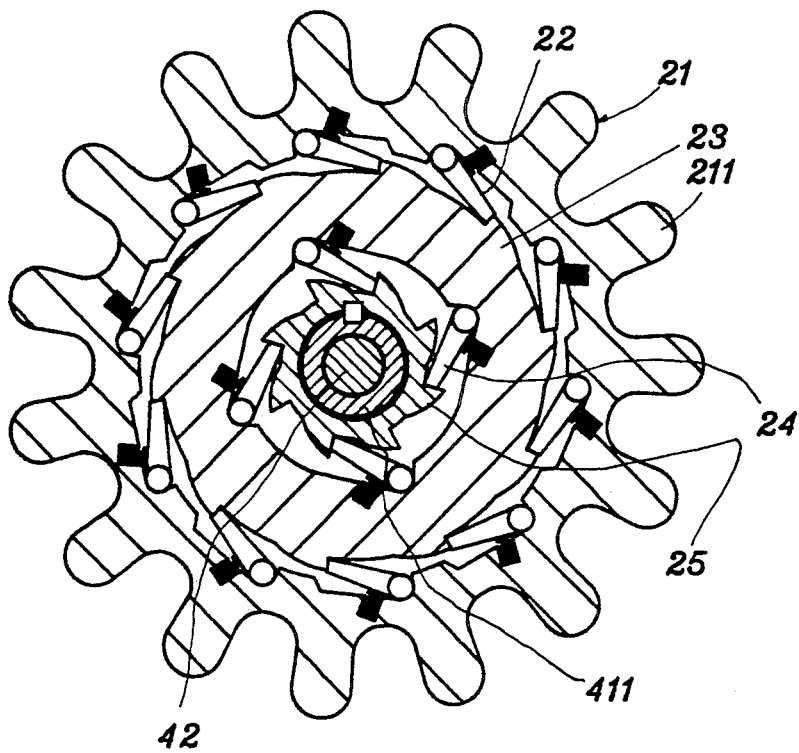
FIG. 6 shows a second speed-variating means of the present invention.

As shown in FIGS. 1 and 6, the present invention comprises: a first speed-variating means 1 secured with a driving means which may be a driving shaft 10 of a pedal 11 of bicycle or other driving system, and at least a second speed-variating means 3 formed on a follower means driven by the driving means and which may be a rear wheel 4 rotated by a second sprocket 21 driven by the driving shaft 10 through a first sprocket 15 rotatably mounted on the shaft 10.

As shown in FIGS. 1-5, the first speed-variating means 1 of the present invention comprises: a planetary gear system 12 having a driving sun gear 13 rotatably coupled to the driving shaft 10 by a first shaft ratchet wheel 131 secured to the shaft 10 and a plurality of pawls 132 annularly pivotally formed in the gear 13, a plurality of driving planet gears 14 respectively engageable with the sun gear 13 and engageable with an internally toothed annulus 141 formed on an outer perimeter of an annulus disk 140 secured to a bush 10a of the shaft 10; a first sprocket 15 having a central bearing 151 rotatably mounted on the shaft 10, a plurality of sprocket teeth 152 circumferentially formed on the sprocket 15 to be coupled with a driving chain 2, and a plurality of right-side ratchet teeth 153 radially, arcuately or cycloidally formed on an outside surface of the sprocket 15 of which an inside surface is protruded inwardly with a plurality of gear pivots 142 for rotatably mounting the planet gears 14 on the pivots 142 opposite to the outside surface of the ratchet teeth 153; a driving ratchet wheel means 16 having a wheel disk 160 with a diameter generally equal to that of the first sprocket 15, a plurality of left-side ratchet teeth 163 radially, arcuately or cycloidally formed on an inside surface of the wheel disk 160 operatively engageable with the ratchet teeth 153 formed on the first sprocket 15, a plurality of pawls 162 annularly pivotally formed in a central portion of the wheel disk 160 engageable with a second shaft ratchet wheel 161 secured to the shaft 10, and an annular flange 164 formed on an outer perimeter of the wheel disk 160; and a clutch means 17 having a U-shaped retainer rotatably engageable with the annular flange 164 of the ratchet wheel means 16 for slidably moving the ratchet wheel means 16 to be engaged with the ratchet teeth 153 of the first sprocket 15. The clutch means 17 may be manually adjusted by a lever fixed on a handle bar of a bike (not shown) to be similar to a conventional automatic transmission provided in a vehicle.

Each tooth of the ratchet teeth 153 of the first sprocket 15 includes a sloping surface slightly tapered frontwardly, whereas each tooth of the ratchet teeth 163 of the driving ratchet wheel means 16 includes a sloping surface slightly tapered rearwardly. Each ratchet tooth of the second shaft ratchet wheel 161 has a sloping surface tapered frontwardly to allow a forward engagement of each pawl 162 with each tooth of the ratchet wheel 161 as shown in direction R1 of FIG. 4 for a forward coupled rotation of the wheel means 16 with the shaft 10 and also for a backward free rotation of the wheel means 16 on the shaft 10.

Figure 5:
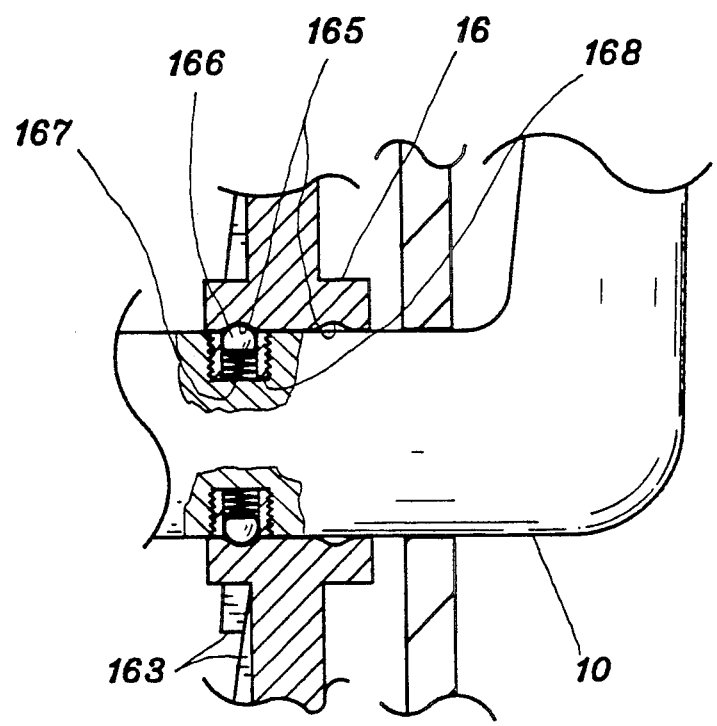
FIG. 5 shows a positioning of the ratchet wheel means on a driving shaft of the present invention.

As shown in FIG. 5, the clutch means 17 may be moved leftwardly for engaging the ratchet wheel means 16 with the first sprocket 15 by engaging a ball 166 resiliently held in a ball socket 168 formed in the shaft 10 by a ball spring 167 with an annular recess 165 recessed in a sleeve 160a formed in a central portion of the ratchet wheel means 16 for stably positioning the wheel means 16.

Figure 2:
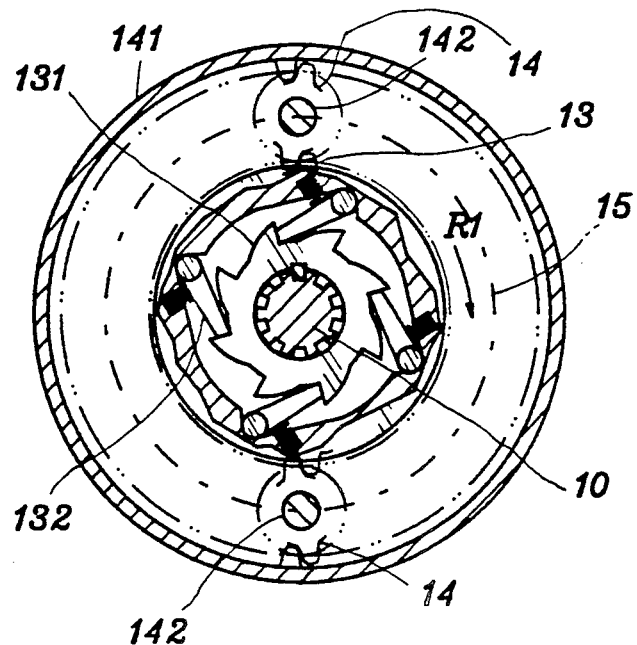
FIG. 2 is a side view of the present invention when viewed from 2—2 direction of FIG. 1.
Figure 3:
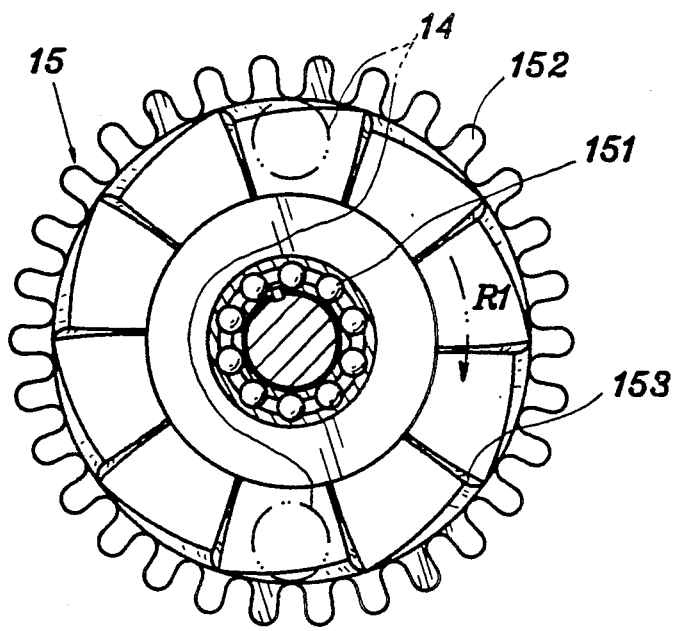
FIG. 3 is an illustration of a first sprocket of the present invention when viewed from 3—3 direction of FIG. 1.
Figure 4:
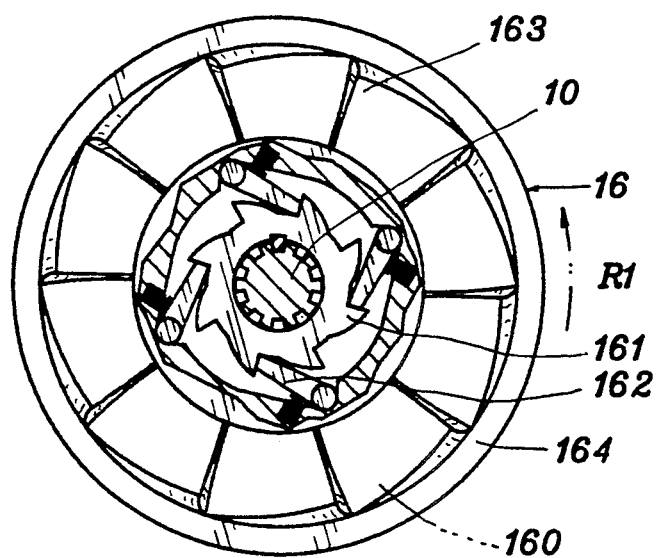
FIG. 4 shows a driving ratchet wheel means when viewed from 4—4 direction of FIG. 1.

Each tooth of the first shaft ratchet wheel 131 includes a sloping surface tapered rearwardly to allow a forward engagement of each tooth of the ratchet wheel 131 with each pawl 132 for a forwardly coupled rotation of the shaft 10 with the sun gear 13 as shown in direction R1 of FIG. 2. However, a forward rotation of the sun gear 13 in direction R1 will not forwardly rotate the shaft 10 because the pawls 132 will slide away from each tooth of the ratchet wheel 131 as shown in FIG. 2. So, the first shaft ratchet wheel 131 and the pawls 132 play a single-way driving rotation by the shaft 10. By the way, when the driving disk 160 is engaged with the first sprocket 15 for a faster speed, the driving of the shaft 10 and the driving wheel disk 160 will not conflict with the relationship of the sun gear 13 with the shaft 10.

Figure 7:
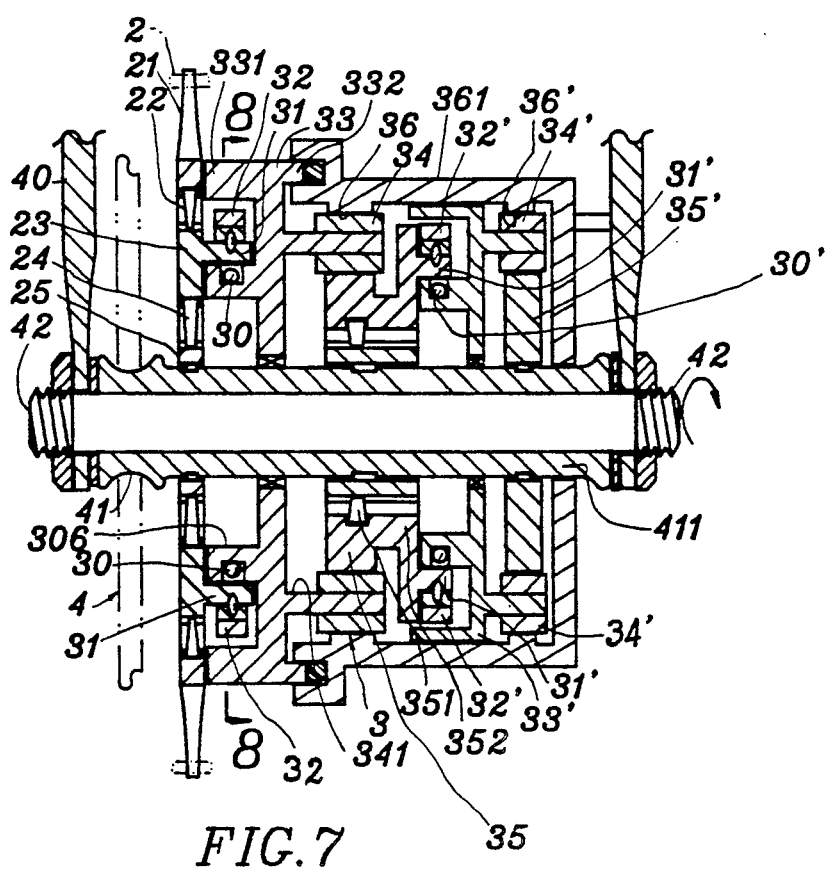
FIG. 7 shows a second sprocket of the present invention.

The driving chain 2 has its rear end portion coupled to a second sprocket 21 rotatably mounted on a rear portion of a bike as shown in FIGS. 6, 7. The second sprocket 21 includes a plurality of sprocket teeth 211 circumferentially formed on the sprocket 21 for coupling the chain 2, a plurality of outer pawls 22 pivotally annularly formed in an outer ring of the sprocket 21 forwardly engageable with an outer ratchet wheel 23 formed in an outer portion of the sprocket 21, a plurality of inner pawls 24 formed in a central portion of the sprocket 21 and forwardly engageable with an inner ratchet wheel 25 secured with a hollow spindle 411 secured with a hub 41 of a rear wheel 4 rotatably mounted on a rear axle 42 secured on a bike fork or body 40. The outer ratchet wheel 23 and the outer pawls 22 as well as the inner ratchet wheel 23 and the inner pawls 24 allow a forward coupling rotation of the sprocket 21 with the spindle 411 and hub 41 as shown in FIGS. 6, 7 allowing a backward free rotation of the sprocket 21 and chain 2.

The second speed-variating means 3 as shown in FIGS. 6-9 comprises: a primary retaining ring 31 secured to an outside surface of the second sprocket 21 and preferably secured on the outer ratchet wheel 23, a primary centrifugal coupling 32 normally retained on the retaining ring 31, a primary coupling wheel 33 rotatably mounted on the spindle 411 having a coupling flange 331 protruding inwardly to be frictionally coupled with the centrifugal coupling 32, a first single-driving way coupling 30 operatively coupling the wheel 33 with the retaining ring 31 formed on the sprocket 21 allowing a forwardly coupling rotation of the wheel 33 and the retaining ring 31 only driven by the wheel 33, a plurality of primary planet gears 34 each gear 34 pivotally mounted on each gear pivot 341 secured on an outside surface of the coupling wheel 33, a primary sun gear 35 secured with a retaining disk 352 and engageable with the planet gears 34 and rotatably mounted on the spindle 411 of the rear wheel hub 41 by a spindle ratchet wheel engageable with a plurality of sun-gear pawls 351 formed in a central portion of the gear 35 allowing a forwardly coupled rotation of the gear 35 and the spindle 411 when driven by the gears 35, 34 and a primary internally toothed annulus 36 formed in an annulus disk 361 secured to a bike body for engaging the planet gears 34 as shown in FIG. 6. The planet gears 34 and the sun gear 35 form a second planetary gear system.

Figure 8:
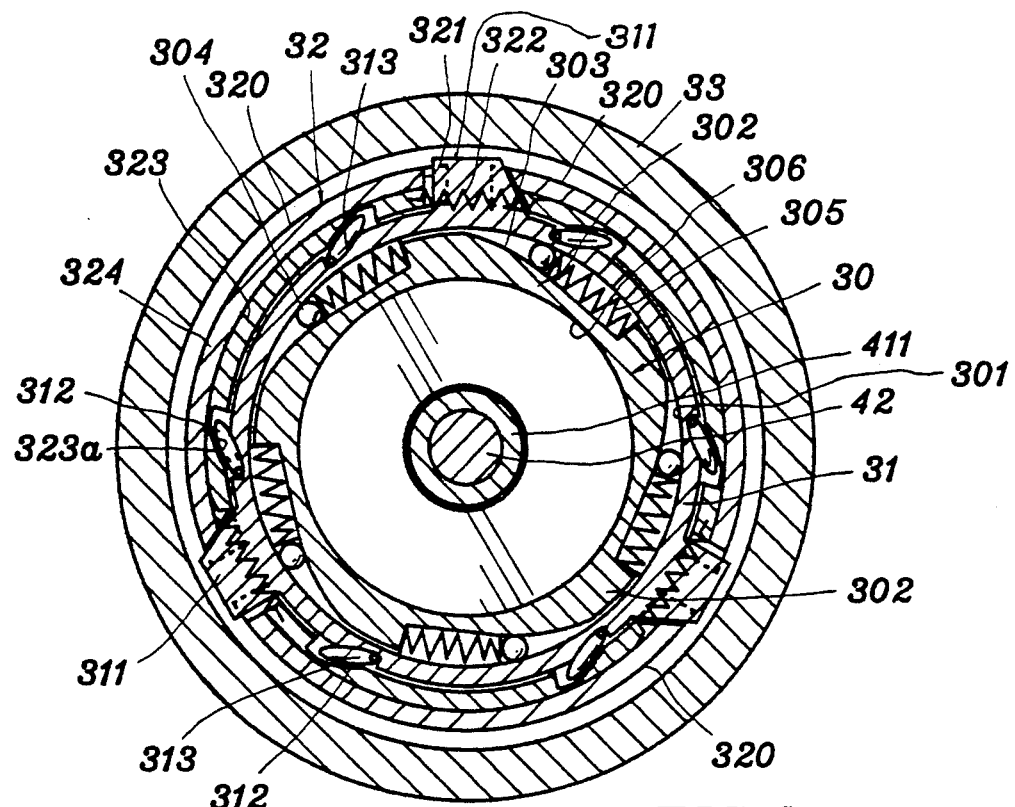
FIG. 8 shows a disengaged centrifugal coupling of the present invention.
Figure 9:
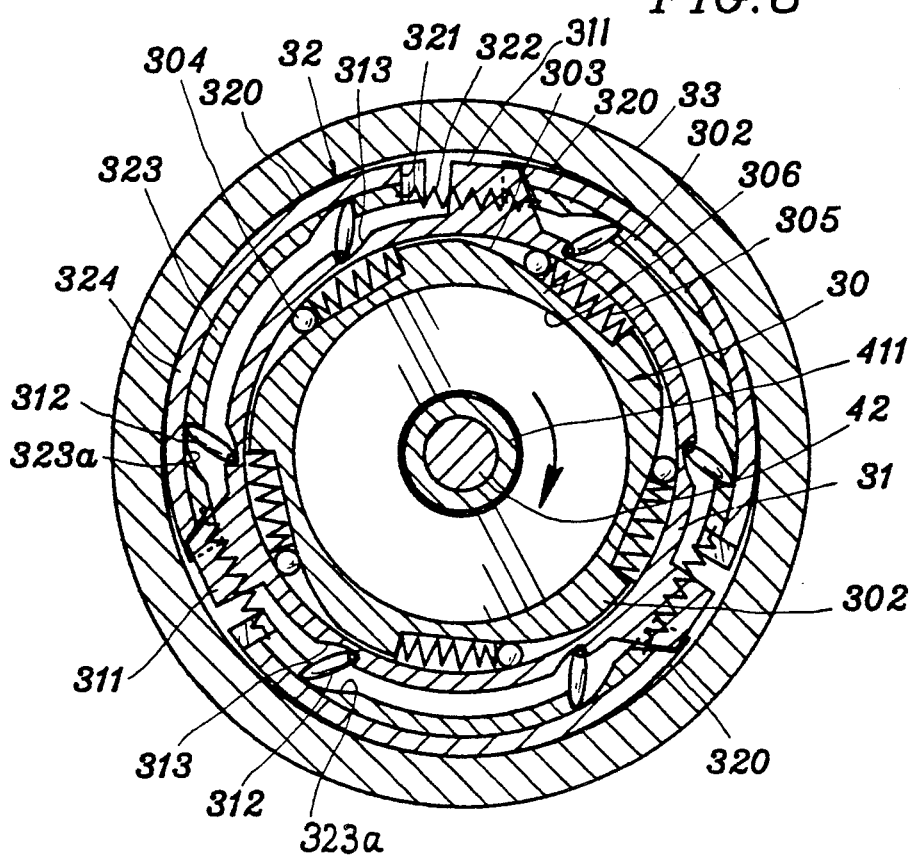
FIG. 9 shows an engaged centrifugal coupling of the present invention.
Figure 10:
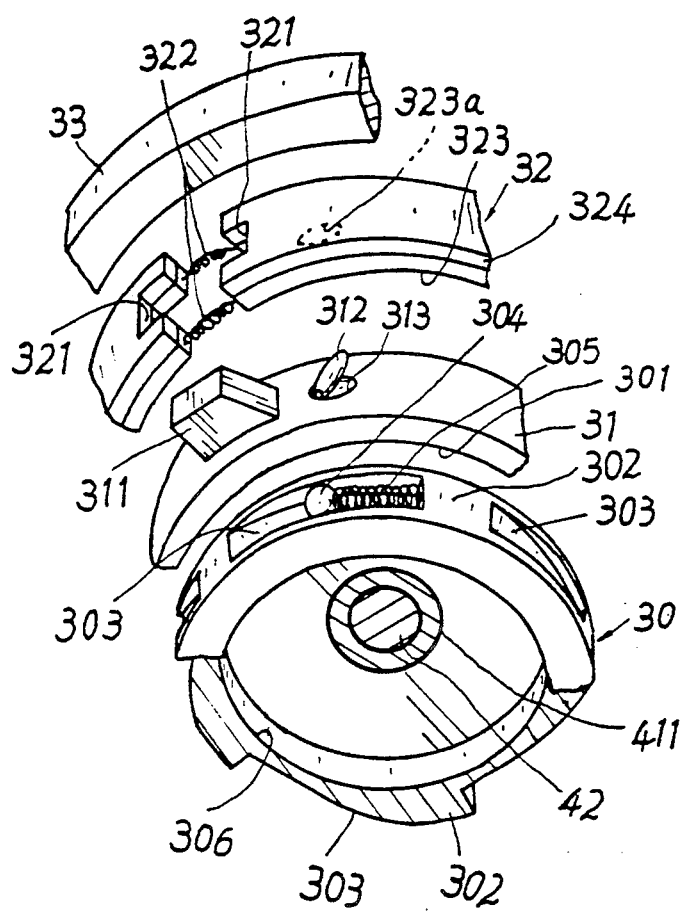
FIG. 10 is a partial perspective view of the centrifugal coupling and the retaining ring of the present invention.

The primary centrifugal coupling 32 as shown in FIGS. 8, 10 includes a plurality of expanding shoes 320 each expanding shoe 320 generally arcuate shaped having two recess portions 321 formed on two opposite end portions of the shoe 320, an inner metal plate 323 having a plurality of upper tenon sockets 323a recessed in a bottom portion of the metal plate 323, an outer frictional pad 324 made of elastomer materials combined with the metal plate 323 for operatively frictionally engaging the coupling flange 331 of the coupling wheel 33 as shown in FIG. 9, and a plurality of tensioning springs 322 each tensioning spring 322 securing every two neighbouring shoes 320.

The primary retaining ring 31 includes a plurality of holder protrusions 311 formed on a circumference surface of the ring 31 normally engageable with two corresponding recess portions 321 of two neighbouring expanding shoes 320 of the centrifugal coupling 32, and a plurality of retaining tenons 312 each tenon 312 having its lower portion normally engaged with a lower tenon socket 313 recessed in the ring 31 as shown in FIG. 8. The protrusion 311 has a sloping surface sloping rearwardly outwardly in order to thrust the shoes 320 radially outwardly about a forwardly rotating direction of ring 31 as shown in FIG. 9. Each tenon 312 serves for additionally operatively supporting the shoes 320 as thrusted by a radial thrusting force as urged by the retaining ring 31 when the bike is accelerated, and the centrifugal couplings 32 are coupled with the coupling flange 331.

The first single-driving way coupling 30 as shown in FIGS. 8 and 6 includes: an outer ring wall 301 formed inside the retaining ring 31, a cam wheel 302 secured with an inner ring 306 formed on a central portion of the coupling wheel 33, and a plurality of wedge portions 303 each wedge portion sloping rearwardly outwardly having a roller 304 resiliently held by a roller spring 305 uriging the roller 304 outwardly rearwardly towards a tapered space defined between the wheel 302 and the ring wall 301 for operatively coupling the cam wheel 302 and the retaining ring 31. The coupling 30 of this invention allows a forward coupling rotation of the retaining ring 31 with the cam wheel 302 and the inner ring 306 as driven by the inner ring 306, and precluding a forward coupled rotation of the retaining ring 31 with the cam wheel 302 secured with the inner ring 306 if driven by the outer retaining ring 31.

So, under a sliding movement of a bike, not treadling the pedals, the moment of inertia of the rotating inner ring 306, cam wheel 302 and the retaining ring 31 may still be coupled for their common rotation, ready for an immediate driving of the second sprocket 21 (outer ratchet wheel 23) as driven by the chain to prevent an idle treadling of pedals 11.

Another set of second speed-variating means 3', similar to the aforementioned speed-variating means 3, as shown in FIG. 6 includes: a secondary retaining ring 31' formed on an outside surface of the retaining disk 352 of first sun gear 35, a secondary centrifugal coupling 32' normally retained on the retaining ring 31', a secondary coupling wheel 33' rotatably mounted on the spindle 411 having a coupling flange 331' protruding inwardly to be frictionally coupled with the centrifugal coupling 32', a second single-driving way coupling 30' operatively coupling the coupling wheel 33' with the retaining ring 31' secured on the first sun gear 35 allowing a forwardly coupling rotation of the wheel 33' and the retaining ring 31' only driven by the wheel 33', a plurality of secondary planet gears 34' pivotally mounted on an outside surface of the coupling wheels 33' and engageable with a second annulus 36' formed on the disk 361, and a secondary sun gear 35' engageable with the planet gears 34' and fixedly mounted on the spindle 411 by a key. The secondary sun gear 35' is fixed on the spindle 411 so that even a bike is sliding without treadling, the moment of inertia of gear 35' will cause a coupling rotation of the two sets of second speed-variating means 3', 3, ready for an immediate driving of the second sprocket 21 as driven by chain 2 as aforementioned. A diameter of the second sprocket is generally equal to that of said coupling wheel 33, 33'. After being manipulated by the planetary gear system of this invention, a running speed of the bike can be increased.

In using the present invention for a manually controlled speed variation by the first speed-variating means 1, a normal running is operated by separating the driving ratchet wheel means 16 from the first sprocket 15 to allow the driving shaft 10 to rotate the driving sun gear 13 to rotate the first sprocket 15 having the driving planet gears 14 engageable with the sun gear 13 to pull the chain 2, thereby rotating the second sprocket 21 and rear wheel 4 for driving a bike at normal slow running speed. If coupling the driving ratchet wheel means 16 with the first sprocket 15, the sprocket 15 will directly drive the chain 2 at a faster speed. The rotation of the sprocket 15 as driven by the ratchet wheel means 16 will not couple a rotation of the first shaft ratchet wheel 131.

If for climbing a sharp slope for instance, the driving ratchet wheel means 16 may be separated from the first sprocket 15 by moving the clutch means 17 rightwardly as shown in FIG. 1 whereby upon a treadling of the pedals 11 to rotate the shaft 10, the sun gear 13 will be rotated to rotate the planet gears 14 to drive the sprocket 15 for running the bike. The rotating speed of the first sprocket 15 is much slower than that of the sun gear 13 so that the driving of the first sprocket 15 will be operated with lighter force.

Now, the second speed-variating means 3, 3' is discussed hereinafter. A first (low) rating of a running speed by the second speed-variating means 3, 3' is obtained by normally driving the second sprocket 21 and the spindle 411 of the rear wheel hub 41, without coupling the sprocket 21 with the coupling wheel 33, plantet gears 34 and sun gear 35.

When the running speed of the bike is increased to a second rating higher than the first rating singly driven by the second sprocket 21, the expanding shoes 320 of the second speedvariating means 3 will be expanded radially outwardly due to their centrifugal force, which overcomes the weight of the shoes 320, to frictionally couple the primary retaining ring 31 secured on the second sprocket 21 with the coupling wheel 33 so that the planet gears 34 and sun gear 35 will be driven by the sprocket 21, to transmit an output work from the sun gear 35 to the spindle 411 to drive the hub 41 of rear wheel 4 to thereby increase the bike running speed automatically at the second-rating speed (from FIG. 8 to FIG. 9).

If the running speed is further accelerated, a second set of second speed-variating means 3' will be actuated to continuously expand the centrifugal coupling 32' to rotate the secondary planet gears 34' and sun gear 35' fixed on the spindle 411 to drive the spindle 411 from the sun gear 35' for a third-rating of the running speed.

The ratings, stages or sets of such a second speed-variating means 3, 3' of this invention are not limited. In practical uses, a first and second rating of running speed is enough for a bike.

Since the ratchet wheel 25 and pawls 24 of the second sprocket 21 are engaged for a forward rotation of the spindle 411 driven by the sprocket 21, a driving force acted by the central spindle 411 will not drive the rotation of the sprocket 21 in view of FIG. 7 so that a high-speed running of the bike after an automatic speed variation by the speed-variating means 3, 3' will not influence the sprocket 21, and the chain 2.

For calculating the speed-variating ratio of the first speed-variating means 1 of the present invention, a formula is shown as follows:

$$N = B/P - 1$$

wherein B is number of teeth of the fixed internally toothed annulus 141 and P is number of teeth of the driving sun gear 13. If B is 48 and P is 36, N is $\frac{1}{3}$ which means that the rotating revolutions (speed) of the first sprocket 15 will be reduced $\frac{1}{3}$ to get a slower running speed.

If the driving ratchet wheel means 16 is engaged with the first sprocket 15, the rotating revolutions (speed) of the first sprocket N15 is equal to that of the ratchet wheel means N16 (N15=N16) so that the output speed by the sprocket 15 is not reduced.

Similarly, regarding the operating principles of planetary gear system of this invention, the sun gear 35, 35' of the second speed-variating means 3, 3' will be accelerated by the planet gears 34, 34' as driven by the second sprocket 21 and the first sprocket 15.

So, if a speed-change ratio of the first speed-variating means 1 is two and a speed-change ratio of the second speed-variating means 3, 3' is three, a total speed-change ratio of the present invention will be six, i.e., 2×3=6.

The present invention has the following advantages superior to a conventional speed-variation means of a bicycle or a vehicle:

1. The speed can be automatically variated without requiring an inconvenient shifting operation as found in a conventional derailleur gear system.

2. The sun gear 13, planet gears 14 and first sprocket 15 can be operated for climbing a sharp sloping surface with lighter force, but with slower speed. When the ratchet wheel means 16 is engaged with the first sprocket 15, a higher speed can be obtained. If the second set of speed-variating means 3, 3' at rear wheel has also been operated, a highest speed can be synergetically obtained.

3. By variating the gear ratios of the planet gears to the sun gear, a greater range of speed variation can be effected in this invention.

4. The automatic speed variation of this invention is clutched by centrifugally frictionally operating the expanding shoes 320 to thereby reduce a vibrational shock and to reduce instant load changes of mechanical stress during speed-variating operation, especially assisted by the tenons 312 which additionally support the shoes 320.

5. The speed variation of this application can be effected directly without requiring any medium such as a hydraulic system used in a conventional car transmission gear box for simpler structure and less maintenance problems.

6. Both manual and automatic speed variations can be selected for practical operating convenience, and also for fancy interest.

The present invention is not limited to be used in a bike speed-variation system. Other vehicles or power transmission systems (not shown) may be modified to incorporate the speed variation systems of this invention therein. The present invention may be suitably modified by those skilled in the art without departing from the scope and spirit of this invention.

I claim:

1. A speed variating system comprising:
   a first speed-variating means including a first planetary gear system comprised of a plurality of driving planet gears and a driving sun gear rotatably mounted on a driving shaft of a driving means operatively driven by said driving means for driving a first sprocket secured with said planetary gear system for obtaining a first running speed, and a driving ratchet wheel means having a diameter generally equal to a diameter of said first sprocket and rotatably mounted on said driving shaft operatively engageable with said first sprocket for driving said first sprocket when driven by said driving shaft for obtaining a second running speed; and
   at least a set of a second speed-variating means including a second planetary gear system rotatably mounted on a hollow spindle secured to a hub of a vehicle wheel, a centrifugal coupling normally retained on a retaining ring secured to a second sprocket which is coupled to said first sprocket and operatively coupling said second planetary gear system with said second sprocket, said second sprocket operatively driven by said first sprocket for driving said second planetary gear system for obtaining at least a third running speed output from said spindle of said hub of said vehicle wheel.

2. A speed variating system according to claim 1, wherein said first speed-variating means includes said first planetary gear system having the driving sun gear rotatably coupled to the driving shaft by a first shaft ratchet wheel secured to the driving shaft and a plurality of first pawls annularly pivotally formed in the driving sun gear operatively engaging the first shaft ratchet wheel, a plurality of driving planet gears respectively engageable with the driving sun gear and engageable with a first internally toothed annulus formed on an outer perimeter of a first annulus disk secured to a bush of the driving shaft; said first sprocket having a plurality of rightside ratchet teeth radially arcuately formed on an outside surface of the first sprocket of which an inside surface is rotatably mounted with the driving planet gears opposite to the outside surface of the right-side ratchet teeth; the driving ratchet wheel means having a wheel disk with a diameter generally equal to that of the first sprocket, a plurality of left-side ratchet teeth radially, arcuately formed on an inside surface of the wheel disk operatively engageable with the right-side ratchet teeth formed on the first sprocket, a plurality of second pawls annularly pivotally formed in a central portion of the wheel disk engageable with a second shaft ratchet wheel secured to the driving shaft, and an annular flange formed on an outer perimeter of the wheel disk; and a clutch means having a U-shaped retainer rotatably engageable with the annular flange of the driving ratchet wheel means for slidably moving the driving ratchet wheel means to be engaged with the right-side ratchet teeth of the first sprocket by engaging an annular recess formed in a sleeve of said driving ratchet wheel means with a ball resiliently held in said driving shaft.

3. A speed variating system according to claim 2, wherein each tooth of the right-side ratchet teeth of the first sprocket includes a first sloping surface tapered frontwardly, and each tooth of the left-side ratchet teeth of the driving ratchet wheel means includes a second sloping surface tapered rearwardly, said two sloping surfaces being operatively engageable with each other to allow a forward engagement of each said second pawl with each tooth of the second shaft ratchet wheel for a forward coupled rotation of the driving ratchet wheel means, the driving shaft and the first sprocket.

4. A speed variating system according to claim 2, wherein each tooth of the first shaft ratchet wheel includes a sloping surface tapered rearwardly to allow a forward engagement of each tooth of the first shaft ratchet wheel with each said first pawl for a forwardly coupled rotation of the driving shaft with the driving sun gear.

5. A speed variating system according to claim 1, wherein a first set of said second speed-variating means includes: a primary retaining ring secured to an outside surface of the second sprocket, a primary centrifugal coupling normally retained on the retaining ring, a primary coupling wheel rotatably mounted on the spindle having a coupling flange protruding inwardly to be frictionally coupled with the centrifugal coupling, a first single-driving way coupling operatively coupling the coupling wheel with the retaining ring of the second sprocket allowing a forwardly coupling rotation of the coupling wheel and the retaining ring only driven by the coupling wheel, a plurality of primary planet gears pivotally mounted on an outside surface of the coupling wheel, a primary sun gear secured with a retaining disk and engageable with the primary planet gear rotatably mounted on the spindle of the hub by a spindle ratchet wheel and a plurality of sun-gear pawls formed in a central portion of the primary sun gear allowing a forwardly coupled rotation of the primary sun gear and the spindle when driven by the primary sun and planet gears, and a primary internally toothed annulus formed in a second annulus disk secured to a vehicle body for engaging the primary planet gears therein.

6. A speed variating system according to claim 5, wherein said primary centrifugal coupling includes a plurality of expanding shoes each expanding shoes generally arcuate shaped having two recess portions formed on two opposite end portions of the shoe, an inner metal plate having upper tenon sockets recessed in a bottom portion of the metal plate, an outer frictional pad made of elastomer materials combined with the metal plate for operatively frictionally engaging the coupling flange of the coupling wheel, and a plurality of tensioning springs each tensioning spring securing every two neighbouring shoes.

7. A speed variating according to claim 5, wherein said primary retaining ring includes a plurality of holder protrusions formed on a circumference surface of the retaining ring normally engageable with two corresponding recess portions of two neighbouring expanding shoes of the centrifugal coupling, and a plurality of retaining tenons each tenon having its lower portion normally engaged with a lower tenon socket recessed in the retaining ring.

8. A speed variating system according to claim 5, wherein said first single-driving way coupling includes: an outer ring secured with the retaining ring, a cam wheel secured with an inner ring formed on a central portion of the coupling wheel and a plurality of wedge portions each wedge portion sloping rearwardly outwardly having a roller resiliently held by a roller spring uriging to roller outwardly rearwardly towards a tapered space defined between the cam wheel and the outer ring for operatively coupling the cam wheel and the retaining ring, said single-driving way coupling allowing a forward coupling rotation of the outer ring and the retaining ring with the cam wheel and the inner ring as driven by the inner ring, and precluding a forward coupled rotation of the retaining ring secured with the outer ring with the cam wheel and the inner ring if driven by the outer retaining ring.

9. A speed variating system according to claim 5, wherein said first set of said second speed-variating means is followed by a second set of second speed-variating means including: a secondary retaining ring formed on an outside surface of the retaining disk of the first sun gear, a secondary centrifugal coupling normally retained on the secondary retaining ring, a secondary coupling wheel rotatably mounted on the spindle having another coupling flange protruding inwardly to be frictionally coupled with the secondary centrifugal coupling, a second single-driving way coupling operatively coupling the secondary coupling wheel with the secondary retaining ring secured on the first sun gear allowing a forwardly coupling rotation of the secondary coupling wheel and the secondary retaining ring only driven by the secondary coupling wheel, a plurality of secondary planet gears pivotally mounted on an outside surface of the secondary coupling wheel and engageable with a second annulus and a secondary sun gear engageable with the secondary planet gears and fixed on the spindle.

10. A speed variating system according to claim 1, wherein said first and said second speed-variating means are coupled by a means selected from a chain and a gear set.

* * * * *